United States Patent
Dowens et al.

(10) Patent No.: US 6,389,114 B1
(45) Date of Patent: *May 14, 2002

(54) METHOD AND APPARATUS FOR RELAYING COMMUNICATION

(75) Inventors: Jac P. Dowens; Amy J. Rupert, both of Red Bank; Blake Lane Wattenbarger, Fair Haven, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,861

(22) Filed: Aug. 6, 1998

(51) Int. Cl.[7] .......................... H04M 1/64; H04M 11/00; H04M 3/42
(52) U.S. Cl. .................. 379/52; 379/88.14; 379/93.15; 379/100.09; 379/201.01; 379/205.01
(58) Field of Search ........................... 379/34, 52, 67.1, 379/88.13, 88.17, 88.21, 93.17, 93.21, 93.23, 100.09, 112, 114, 158, 201, 32.01, 38, 51, 93.15, 201.01, 205.01, 88.14; 455/417, 445, 461; 348/14–17

(56) References Cited

U.S. PATENT DOCUMENTS

| | | | |
|---|---|---|---|
| 5,163,081 A | * 11/1992 | Wycherley et al. | ............ 379/52 |
| 5,479,487 A | * 12/1995 | Hammond | .................. 379/67.1 |
| 5,712,901 A | 1/1998 | Meermans | .................... 379/88 |
| 5,742,905 A | * 4/1998 | Pepe et al. | .................... 455/461 |
| 5,787,148 A | * 7/1998 | August | .......................... 379/52 |
| 5,917,888 A | 6/1999 | Giuntoli | ....................... 379/52 |
| 5,943,395 A | * 8/1999 | Hansen | ......................... 379/52 |
| 5,978,014 A | * 11/1999 | Martin et al. | .................. 348/15 |
| 5,982,863 A | * 11/1999 | Smiley et al. | ............... 379/112 |
| 6,061,718 A | * 5/2000 | Nelson | ........................ 709/206 |
| 6,181,736 B1 | * 1/2001 | McLaughlin et al. | ........ 375/222 |

* cited by examiner

*Primary Examiner*—Allan Hoosain
(74) *Attorney, Agent, or Firm*—Oliff & Berridge, PLC

(57) ABSTRACT

The invention provides a telecommunication relay device that relays communication from a first party to at least one second party. The first party and the second party may use terminals of different types such as telephone stations, text telephones, two-way pagers, personal digital assistants with communication capabilities, data network terminals, etc. The telecommunication relay device converts text received from text terminals into voice for voice terminals and converts voice to text and vice versa. The telecommunication relay device also permits the first party to leave messages for other parties. For example, the first party may send an e-mail message using a telephone station or receive an e-mail using a telephone station. In addition, the telecommunication relay device may open a private chat room to allow communication between data network terminals and telephone stations, for example. The telecommunication relay device may also provide conferencing capability where the conferees may use different type terminals.

22 Claims, 5 Drawing Sheets

| SUBSCRIBER ID (e.g., PHONE #) | SUBSCRIBER'S OTHER CONTACT IDENTIFICATIONS | MESSAGE OUTPUT OPTIONS | PREFERENCES | ... |
|---|---|---|---|---|
| SUBSCRIBER 1 | VOICE MAILBOX INTERNET E-MAIL PAGER ⋮ | VOICE MAILBOX DIRECTORY ID | HUMAN OPERATOR | ... |
| SUBSCRIBER 2 | | | | ... |
| ⋮ | ⋮ | ⋮ | ⋮ | ⋮ |

METHOD AND APPARATUS FOR RELAYING COMMUNICATION

BACKGROUND OF THE INVENTION

1. Field of Invention

This invention relates to relaying communications between parties.

2. Description of Related Art

Current telecommunication relay services enable those subscribers who communicate using text telephones (TTs) to converse with parties audially and vice versa. When a subscriber, via a text terminal, calls another party through a telecommunication relay service, a human operator of the telecommunication relay service translates the text into voice for the called party and voice to text from the called party to the subscriber. However, if either the called party does not answer or when a subscriber is called by another party and the subscriber does not answer, the calls must be repeated at a different time in order for the subscriber and the other party to communicate. Thus, new technology is needed to provide communication even when one of the parties does not answer.

SUMMARY OF THE INVENTION

The invention provides a telecommunication relay device that relays communication from a first party to at least one second party. The first party and the second party may use terminals of different types such as telephone stations, text telephones, two-way pagers, personal digital assistants with communication capabilities, data network terminals, etc. The telecommunication relay device converts text received from text terminals into voice for voice terminals and converts voice or text into a form suitable for a data network terminal coupled to a private chat room and vice versa. Thus, the telecommunication relay device permits parties using different types of terminals to communicate with each other.

The telecommunication relay device also permits the first party to leave/receive messages for/from other parties where the message may take a form that cannot be handled by the terminal used by the first party. For example, the first party may send an e-mail message using a telephone station or receive an e-mail using a telephone station. In addition, when the first party requests the telephone communication relay device to contact a second party that is logged onto the data network, the telecommunication relay device opens a private chat room and converts the information received from the first party via a telephone station into private chat room text and converts text entered by the second party in the private chat room using a data network terminal into voice and outputs the voice to the first party. Thus, the telecommunication relay device provides messaging services where the messages cannot be sent directly by the terminal of the first party.

The telecommunication relay device may also provide a conferencing capability where the conferees may use different type terminals. For example, the first party may use a telephone station while the second party may use a text telephone and a third party may use a data network terminal. The telecommunication relay device converts the information received from the conferees and converts the information into a form that is compatible to all the conferees terminals. Thus, a conference may be conducted among conferees having different type terminals.

BRIEF DESCRIPTION OF THE DRAWINGS

The invention is described in connection with the following figures wherein like numerals represent like elements, and wherein.

DETAILED DESCRIPTION OF PREFERRED EMBODIMENTS

Figure 1:
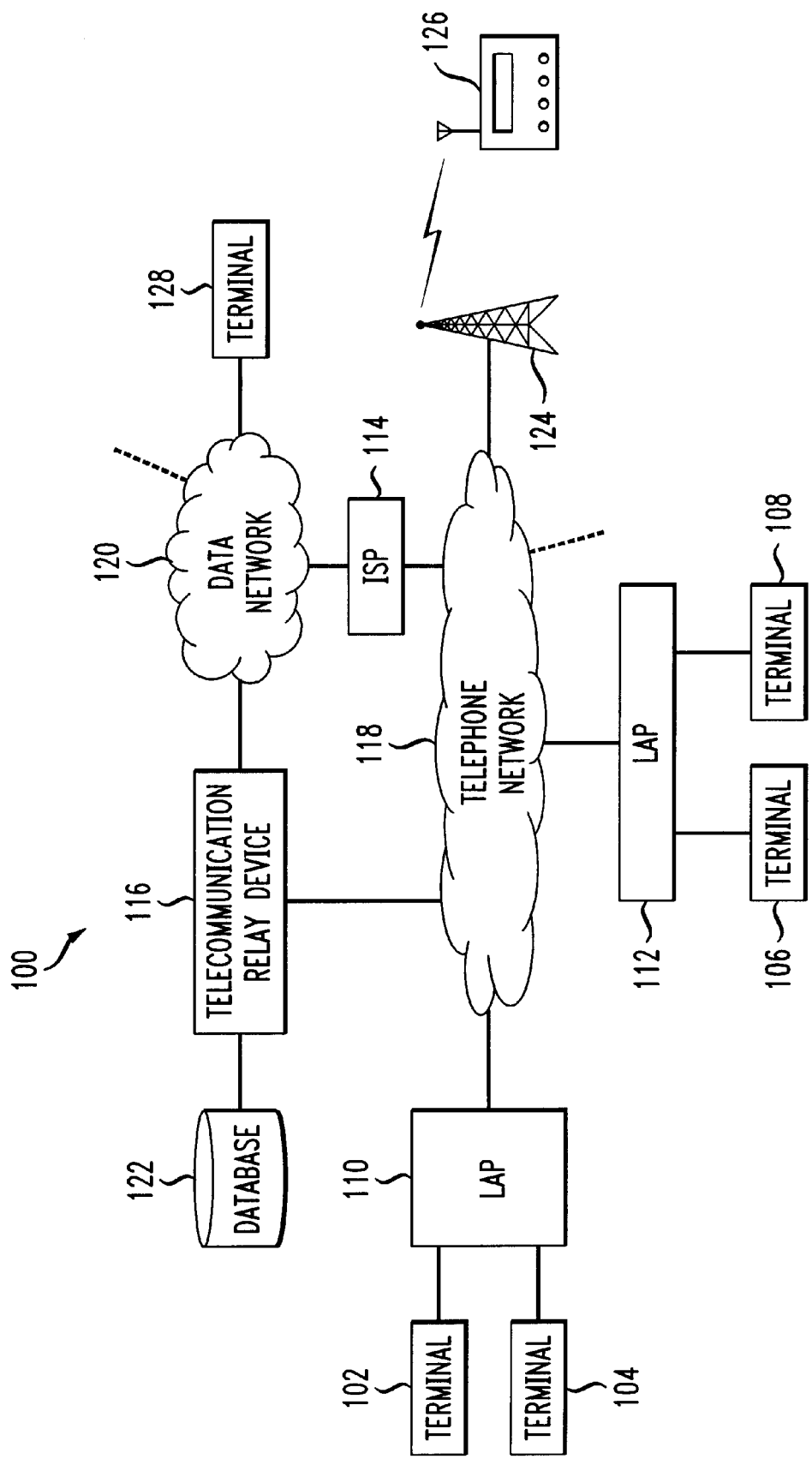
FIG. 1 is a block diagram of a telecommunication relay system.

FIG. 1 shows a block diagram of a telecommunication relay system 100 that includes terminals 102-108 coupled to a telephone network 118 through local access providers (LAP) 110 and 112. The LAPs 110 and 112 may be local exchange carriers, for example. The telephone network 118 is also coupled to a data network 120 (Internet, for example) through an independent service provider (ISP) 114. A telecommunication relay device 116 is coupled to both the telephone network 118 and the data network 120 and has access to a database 122. The telephone network 118 provides access to a paging tower 124 that transmits and receives messages from pagers such as pager 126. The terminals 102–108 may be telephone stations, text communication terminals such as personal computers, personal digital assistants (PDAs) having communication capabilities, two-way pagers, or text telephones (TTs) which may be used by speech or hearing-impaired persons.

For ease of discussion, the remainder of the description uses the word "call" in the generic sense of one party contacting another party. For example, a party may contact another party via a telephone station in a voice call, via a text telephone in a text call through the telecommunication relay device, via e-mail or via a chat room when logged on to the data network 120. When the word call is used, voice, text, e-mail, etc. are included as methods of "calling" or "contacting" .

Answering a call indicates an interactive act and real time communication may proceed. In most cases, e-mail is not considered interactive, even though in some instances e-mail exchanges may support real time communication. Such interactive text communication is dependably provided either through chat rooms or other text-to-text communication where real time communication can be expected (e.g., text telephone communication).

When a first party using the terminal 102 calls a second party at the terminal 108 through the telecommunication relay device 116, and the second party answers the call, the telecommunication relay device 116 relays information received from the first party to the second party and vice versa. The telecommunication relay device performs voice-to-text/text-to-voice conversion when required. Such conversion would be required if one of the terminals 102, 108 is a text terminal while the other one of the terminals 102, 108 is a voice terminal, for example. If conversion is required, the telecommunication relay device 116 performs the conversion either via voice-to-text and text-to-voice devices such as voice recognizers and speech synthesizers or via a communications attendant so that the first party and the second party may communicate even if the terminals 102, 108 used are of different types. If conversion is not required, then the telecommunication relay device 116 bridges the terminal 102 to the terminal 108 either via a text bridge for text communication or a voice bridge for voice communication. the text bridge may perform text-to-text conversions and/or format and header adjustments to achieve compatibility between different text terminals. If the terminals 102 and 108 are both personal computers connected to the data network such as Internet, the telecommunication relay device 116 may create a private chat room to bridge the terminals 102 and 108, for example.

If, in the above example, the second party does not answer the call from the first party, the telecommunication relay device 116 may provide a variety of messaging services to the first party. For example, the telecommunication relay device 116 may save a message in a mailbox for the second party, search whether the second party is logged on to the data network 120 (Internet, for example) and support a communication between the first party and the second party via the data network 120, send an e-mail message to the second party, page the second party via the paging tower 124, etc.

When a message is saved from a caller using a voice terminal, the voice message may be converted into text by either voice recognition devices or a communications attendant or may be saved as voice data and converted later, if needed, when delivering the message. The telecommunication relay device 116 then adds calling and/or called party identifications such as telephone numbers to the message by adding a message header, for example. In this way, when the message is retrieved, the telecommunication relay device 116 may initiate a call to the party who left the message if desired by the party retrieving the message.

The telecommunication relay device 116 may also provide message delivery services. For example, when using a telephone station, a caller may call the telecommunication relay device 116 to leave an e-mail message for another party. The telecommunication relay device 116 receives the e-mail address either from the caller or from a directory stored in the database 122, formats the message and sends the message to the e-mail address. The telecommunication relay device 116 may also receive messages for subscribers that cannot be received by subscriber terminals such as e-mail by telephone stations, for example. Thus, a subscriber having only a voice terminal such as a telephone station may distribute an e-mail address provided by the telecommunication relay device 116 to receive e-mail messages.

When a subscriber makes a call through the telecommunication relay device 116 and the subscriber has messages (either in text or in voice) in a mailbox, the telecommunication relay device 116 may offer the subscriber the opportunity to retrieve the messages and make any calls responding to the messages. If the messages are in text such as e-mail and the subscriber is using a voice terminal such as a telephone station, the telecommunication relay device 116 may convert the text messages into voice (automatically or via the communications attendant) and output the voice messages to the subscriber. However, if the subscriber is using a text terminal such as a two-way pager and the messages are in voice, the telecommunication relay device 116 may convert the voice messages into text and output the text to the subscriber. Thus, the telecommunication relay device 116 provides complete communication among subscribers using voice or text at any stage of the communication.

Figures 2, 3:
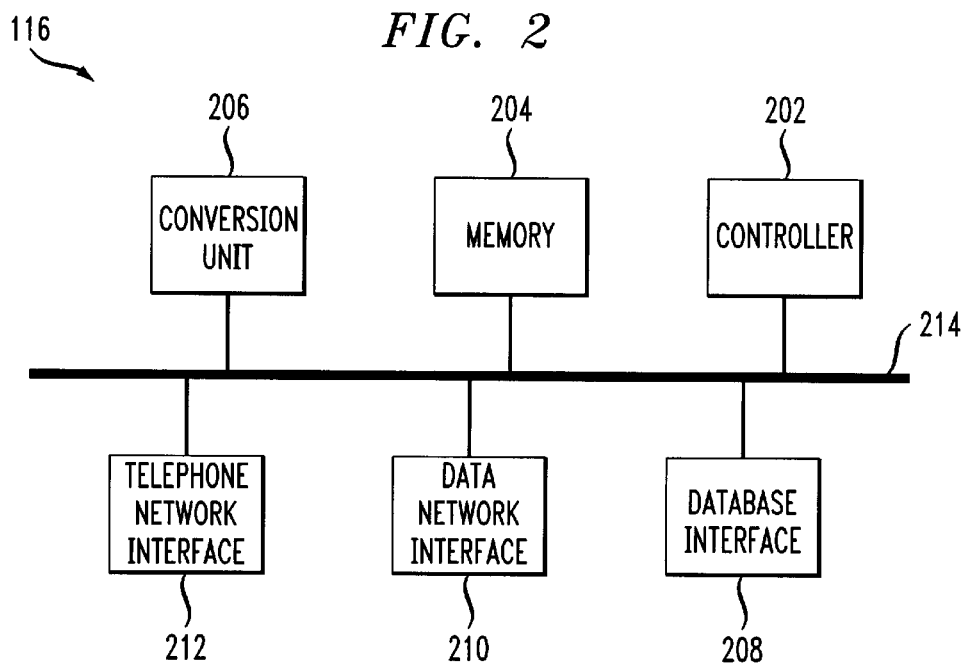
FIG. 2 is a block diagram of a telecommunication relay device.
FIG. 3 is an exemplary diagram of a subscriber profile database.

FIG. 2 shows a block diagram of the telecommunication relay device 116. The telecommunication relay device 116 includes a controller 202, a memory 204, a conversion unit 206, a database interface 208, a data network interface 210 and a telephone network interface 212. All of the above components are coupled together via bus 214.

The conversion unit 206 may be an automatic voice-to-text/text-to-voice unit incorporating voice recognition and speech synthesis devices. However, the conversion unit may also be a human communications attendant who transmits and receives information to/from the bus 214 via a terminal that includes a speaker and a microphone (or headset), for example. The database interface 208 interfaces to the database 122. While FIG. 1 shows the database 122 as separate from the telecommunication relay device 116, the database 122 may be incorporated in the memory 204. If incorporated in the memory 204, the database interface 208 would not be required.

When the first party calls the telecommunication relay device 116 through the telephone network 118, the controller 202 receives the call through the telephone network interface 212. The controller 202 searches the database 122 to determine whether there are any messages such as e-mail or voice messages in the first party's mailbox. If such messages exist, the controller 202 queries the first party whether reviewing the mailbox messages would be desired. If desired, the controller 202 retrieves the messages and sends them to the first party.

The controller 202 may first send a number of messages that are in the mailbox to the first party. The first party may then choose which of the messages to receive. If the first party is using a terminal having a display, the telecommunication relay device 116 may send a list of messages that includes a summary of each message such as the name and number of the person that left the message, for example. The first party may then select from the list a message to read.

The controller 202 may send the messages to the first party in a variety of ways depending on whether the messages have been saved as voice or text and whether the terminal of the first party is a voice terminal or a text terminal. The following are examples of possible combinations:

1) If the first party called the telecommunication relay device 116 using a voice terminal such as terminal 102, then the controller 202 outputs voice messages directly to the first party. If the messages are text-oriented such as e-mail, the controller 202 first sends the message to the conversion unit 206 that converts the text into voice signals and then the voice signals are output to the terminal 102.

2) If the first party called the telecommunication relay device 116 using a text terminal such as a text telephone, for example, then the controller 202 outputs text messages directly to the text telephone. If the messages are voice messages, the controller 202 sends the messages to the conversion unit 206 to convert the messages from voice-to-text and the text output is sent to the text telephone.

3) If the first party called the telecommunication relay device 116 using a data network terminal (which may be a personal computer, for example) logged on to the data network 120 through the ISP 114, for example, then the telecommunication relay device 116 sends the messages to the first party through the data network 120. The same would be true if the first party is logged on to the data network directly through a terminal 128, for example.

4) If the first party called the telecommunication relay device 116 through a two-way pager 126, then the telecommunication relay device 116 may return messages to the two-way pager 126 through the telephone network 118 and the paging tower 124. The first party may then select various response options by pushing appropriate buttons of the two-way pager 126 such as send messages (which may be prerecorded) in response to the various messages.

After each message, the controller 202 queries the first party whether the first party would like to contact a second party that sent the message. If the first party elects to make the contact, the controller 202 retrieves the second party's identification which was formatted with the message and initiates an outgoing call or sends a reply message to the second party, for example.

If a call is made and the second party answers the call, the controller 202 determines whether the terminals of the first and second parties are compatible. For example, if the first party using the terminal 102 is a voice terminal and the second party using the terminal 106, for example, is also a voice terminal, then the controller 202 simply bridges terminals 102 and 106 together in a voice connection and monitors the call for completion. The same would occur if both the terminals 102 and 106 are text terminals; the controller 202 simply bridges the two text terminals for text communication and monitors for call completion. However, if the terminals 102 and 106 are of different types such as voice and text terminals, the controller 202 activates the conversion unit 206 so that conversion from voice-to-text and text-to-voice is performed to permit communication between the first and second parties. If either the first or second parties are connected to the telecommunication relay device 116 through the data network 120, then the controller 202 opens a private chat room on the data network 120 and the party logged on to the data network 120 communicates to the other party via the private chat room.

For example, if the first party called the telecommunication relay device 116 via the terminal 128 and the second party is communicating using a voice terminal such as a telephone station (terminal 108), then the controller 202 converts the voice signals received from the terminal 108 into text and outputs the text into the private chat room while new text entered by the first party in the private chat room is converted to voice and transmitted to the terminal 108. If the second party is using a text terminal such as terminal 106 (not a PC logged on to the data network 120, for example), then the controller 202 transfers the text received from the terminal 106 to the private chat room and the text entered by the terminal 128 in the private chat room is transferred to the text terminal 106. The controller 202 may perform any text-to-text conversion, if required. Thus, the controller 202 permits communication between two parties communicating using different types of terminals whether voice, text or the data network 120 such as the Internet, for example.

The controller 202 monitors the communication between the first and second parties until the communication is completed and then queries whether the first party would like to review additional messages or make another call. The controller 202 receives the first party's selection and performs the selected service accordingly.

If the second party does not answer the first party's call, then the controller 202 queries whether the first party would like to leave a message for the second party. If the first party elects to leave a message, the controller 202 retrieves a profile for the first party and determines the first party's preferences for leaving messages. For example, FIG. 3 shows profile data 300 stored in the database 122 for various subscribers. The profile data 300 includes subscriber identifications 302, subscriber's other contact identifications 304, message output options 306 and preferences 308, for example. The subscriber identifications 302 may include the subscriber's name or the subscriber's telephone number. The subscriber's other contact identifications 304 may include the subscriber's mailbox identification, Internet identification (Internet page address, for example), e-mail address, pager capcode, etc. The message output options 306 include the preferred methods that the subscribers choose to leave messages for other parties. The message output options 306 may include an explicit designation such as mailbox or may include identifications of contact directories that list all the potential parties for which the subscribers may wish to leave a message. The preferences 308 contains the subscriber's preferences for various features offered by the telecommunication relay device 116. For example, subscriber 1 prefers a human operator to perform text-to-voice and voice-to-text conversion rather than a voice recognizer and speech synthesizer.

Figure 4:
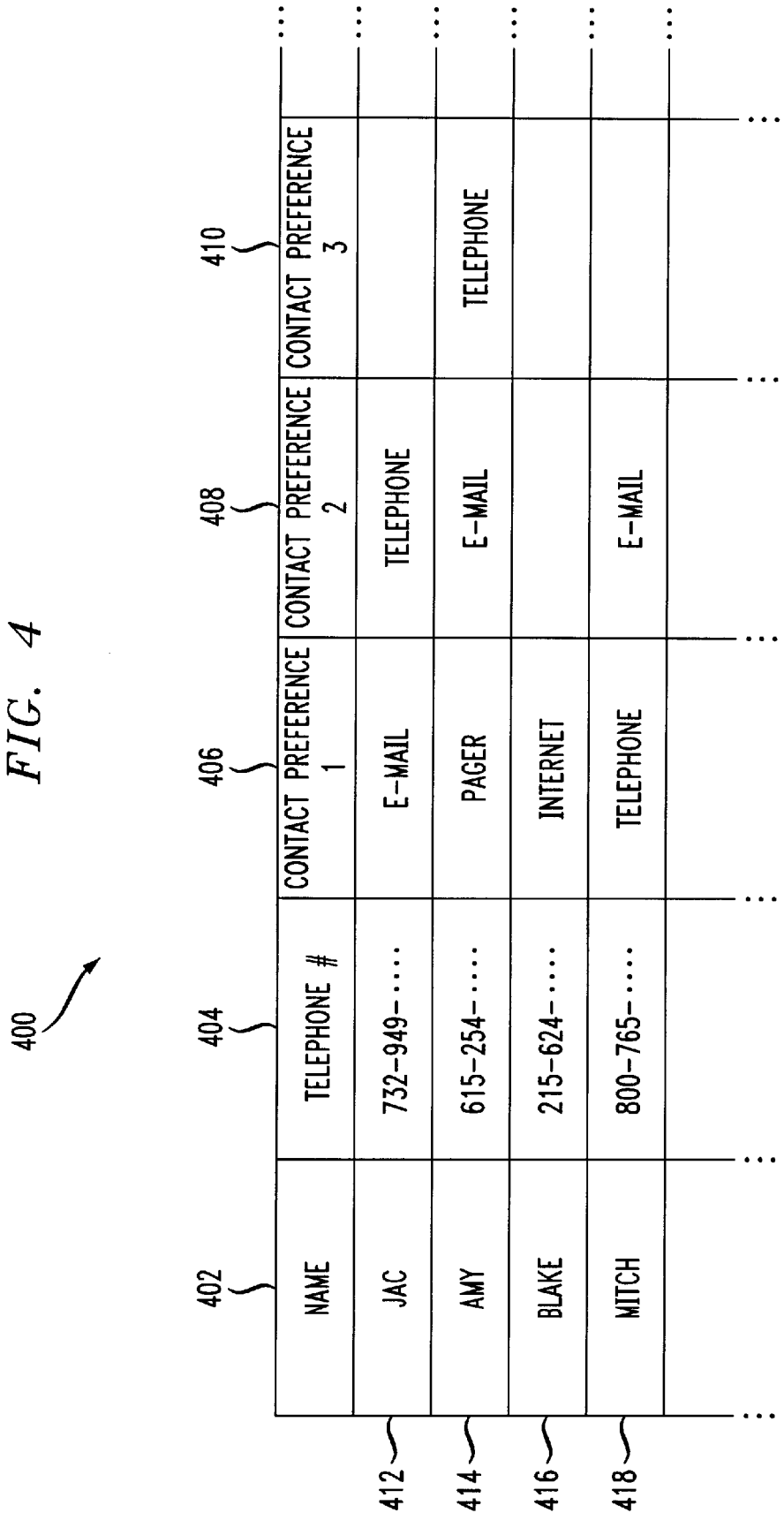
FIG. 4 is an exemplary diagram of a subscriber contact directory.

FIG. 4 shows an example of a contact directory 400. The contact directory 400 may include a name field 402, telephone number field 404, and contact preferences fields 406–410. For example, entry 412 indicates that Jac should be first contacted by using e-mail and then by telephone if for some reason the e-mail message did not reach its destination. For entry 414, Amy should be first contacted via her pager and then by e-mail, and if all else fails, by a telephone call. After retrieving the profile and selecting the appropriate message output option, the controller 202 initiates the message to the second party by sending e-mail, sending a page or making a telephone call and delivering a voice message.

TABLE

| Case Number | Calling Party | Called Party | Answered? | Telecommunication Relay Device Response |
|---|---|---|---|---|
| 1 | Voice | Voice | Yes | Voice Bridge |
| 2 | Voice | Voice | No | Retrieve Profile; Leave message: Mail box, Internet, e-mail, etc. |
| 3 | Voice | Text | Yes | Voice-To-Text & Text-To-Voice |
| 4 | Voice | Text | No | Retrieve Profile; Leave message: Mail box, Internet, e-mail, etc. |
| 5 | Voice | Data Network | Yes | Private Chat Room and Voice-To-Text & Text-To-Voice |
| 6 | Voice | Data Network | No | Retrieve Profile; Leave message: Mail box, e-mail, etc. |
| 7 | Text | Voice | Yes | Voice-To-Text & Text-To-Voice |
| 8 | Text | Voice | No | Retrieve Profile; Leave message: Mail box, Internet, e-mail, etc. |
| 9 | Text | Text | Yes | Text Bridge |
| 10 | Text | Text | No | Retrieve Profile; Leave message: Mail box, Internet, e-mail, etc. |
| 11 | Text | Data Network | Yes | Private Chat Room and Voice-To-Text & Text-To-Voice |
| 12 | Text | Data Network | No | Retrieve Profile; Leave message: Mail box, e-mail, etc. |
| 13 | Data Network | Voice | Yes | Private Chat Room and Voice-To-Text & Text-To-Voice |
| 14 | Data Network | Voice | No | Retrieve Profile; Leave message: Mail box, Internet, e-mail, etc. |

TABLE-continued

| Case Number | Calling Party | Called Party | Answered? | Telecommunication Relay Device Response |
|---|---|---|---|---|
| 15 | Data Network | Text | Yes | Private Chat Room and Text transfer |
| 16 | Data Network | Text | No | Retrieve Profile; Leave message: Mail box, Internet, e-mail, etc. |
| 17 | Data Network | Data Network | Yes | Private Chat Room |
| 18 | Data Network | Data Network | No | Retrieve Profile; Leave message: Mail box, e-mail, etc. |

The first party may direct the telecommunication relay device 116 to contact a second party. The table above shows an exemplary list of the possible cases when the telecommunication relay device contacts the second party for the first party. For ease of discussion, the first party is referred to as the calling party and second party is referred to as the called party. The calling and called party may use terminal types other than telephone stations. Thus, calling party is the communication initiating party, called party is the communication contacted party, call is the act of contacting, and answer is the act of responding.

In case 1, the calling party and the called party both use voice terminals and the call is answered. In this case, the telecommunication relay device 116 simply bridges the calling party with the called party and monitors the call for call completion. In case 2, the calling party does not answer the call and the telecommunication relay device 116 retrieves the calling party's profile and attempts to reach the called party via the data network, another telephone number such as a cell phone, a pager, etc. If the called party cannot be reached, the telecommunication device 116 leaves a message for the called party via the various options such as mailbox, e-mail, etc. if desired by the calling party.

In case 3, the calling party is using a voice terminal while the called party is using a text terminal and the called party answers the call. In this case, the telecommunication relay device 116 performs voice-to-text and text-to-voice conversions either automatically or via a communications attendant to permit the calling and called parties to communicate. In case 4, the called party does not answer and the telecommunication relay device 116 performs similar functions as in case 2.

In case 5, the called party is logged onto the data network 120. The telecommunication relay device 116 sends a message such as "If you want to talk to Jac enter yes, otherwise, enter no" to be displayed to the called party. Of course, other more complex graphical displays may also be used. If the called party chooses to communicate with the calling party, the telecommunication relay device 116 may open a private chat room where the called party can enter text and the telecommunication relay device can transfer the entered text to the calling party as voice signals and the voice signals of the calling party may be converted to text and entered into the private chat room. If the called party does not wish to talk to Jac, then the telecommunication relay device 116 may retrieve the calling party's profile and offer to leave a message similar to cases 2 and 4.

Cases 8 and 10 are similar to case 4 except the calling party is transmitting information to the telecommunication relay device 116 in text instead of voice. Case 7 is similar to case 3. In case 9, the telecommunication relay device performs a text bridge between the calling and the called party by transferring the text received from one of the parties to the other party and reformatting the text to adapt between different text terminals, if necessary.

For example, in case 11, the calling party is using a text terminal such as a TT while the called party is logged onto the data network 120. The telecommunication relay device 116 receives the text from the TT, reformats the text into a suitable form for the private chat room and outputs the reformatted text to the called party. Text entered by the called party is reformatted for the TT and output to the calling party.

Case 12 is similar to case 6 and cases 13–16 are similar to cases 5, 6, 11 and 12, respectively. In case 17, the telecommunication relay device 116 creates the private chat room, monitors activity, and closes the private chat room when the parties finish their communication. Case 18 is similar to cases 6, 12 and 16.

The above description relates to a first party specifically calling one other second party to engage either in a communication or, if the second party fails to answer, to send a message to the second party. The telecommunication relay device 116 may offer other services such as teleconferencing or simply leaving a message for another party without desiring to engage in a real time live communication with another party. When such a message is left, the message is saved without any conversion. The conversion from text-to-voice or voice-to-text is performed when the message is retrieved, if necessary. In this way, multiple conversions may be avoided because if conversion is performed before the message is saved, a second conversion may be necessary if the message is retrieved using a terminal type incompatible with the saved message.

When the first party desires to make a conference call, the controller 202 receives a list of conferees from the first party. Such a list may be sent to the controller 202 when the first party requests such a conference or the first party may have established conferee lists and merely directs the controller 202 to a selected conferee list. The controller 202 then retrieves the list from the database 122, for example, and proceeds to initiate the teleconference. The list may already indicate to the controller 202 the type of terminals corresponding to each conferee or the controller 202 may determine the terminal type of a conferee after contacting the conferee and interface with the conferee terminal accordingly.

When the controller 202 initiates connections to the conferees from the list and a conferee answers, the controller 202 may determine whether conversion is required (e.g., if the conferee list does not indicate a terminal type or if the connection was call-forwarded to a different type of terminal). For example, if the first party is using a voice terminal while a contacted conferee is using a text terminal, the controller 202 performs voice-to-text and text-to-voice conversions, as discussed above. Also, if one of the terminals is logged on to the data network 120, the controller 202 opens a private chat room and permits conferencing through the private chat room.

If the potential conferee does not answer, the controller 202 queries the first party whether a message should be left for the conferee. If the first party chooses to leave a message, the controller 202 selects message options via the first party's profile or queries the first party for a message option and sends the message. The controller 202 performs the same procedure for each conferee so that a conference may be conducted among conferees having different types of terminals communicating using voice, text and data network such as Internet connections, for example. The controller 202 couples the conferees together and converts voice or text output to all the conferees as appropriate for their particular type of terminal.

If the first party calls the telecommunication relay device 116 only to leave a message without real time communication, the controller 202 retrieves the first party's profile to select a message option or receives an option from the first party and sends the desired message. In this way, first parties only using voice communication terminals may send e-mail to other parties having e-mail accounts or the first party may send an e-mail to a receiving party that has only voice communication terminals such as a telephone station. When the subscriber (receiving party) makes a call, the telecommunication relay device 116 is alerted and converts the e-mail text message into a voice message and delivers the voice message to the receiving party.

The telecommunication relay device 116 may communicate with the LAP 110 or 112 of the receiving party so that the LAP 110 or 112 may alert the telecommunication relay device 116 when the receiving party goes-off hook, for example. When the off-hook condition is received, the telecommunication relay device 116 may deliver any messages to the subscriber. If non-subscribers receive messages from subscribers, the telecommunication relay device 116 may contact the non-subscriber by launching a telephone call, sending e-mail, or using other message delivery methods as may be specified by the non-subscriber such as by paging, for example. Non-subscribers may also use the telecommunication relay device 116 by paying for the service via calling cards, for example. Thus, the telecommunication relay device 116 permits parties to communicate using any communication device with other parties without restricting the type of device the other party uses.

If one of the parties is a subscriber to a service using the telecommunication relay device 116, then the subscriber would be billed for the service. Thus, whether the subscriber is a calling party or a called party, the telecommunication relay device 116 retrieves the subscribers account information from the database 122, for example, and charges the account for the cost of the call.

When two communicating parties are both subscribers, then the calling party may bear the cost or both parties may share the cost based on prior selected billing options. These options may be saved in the subscriber's profile, for example. In a conference situation, an independent account such as a corporate teleconferencing account may be charged for the costs.

Figure 5:
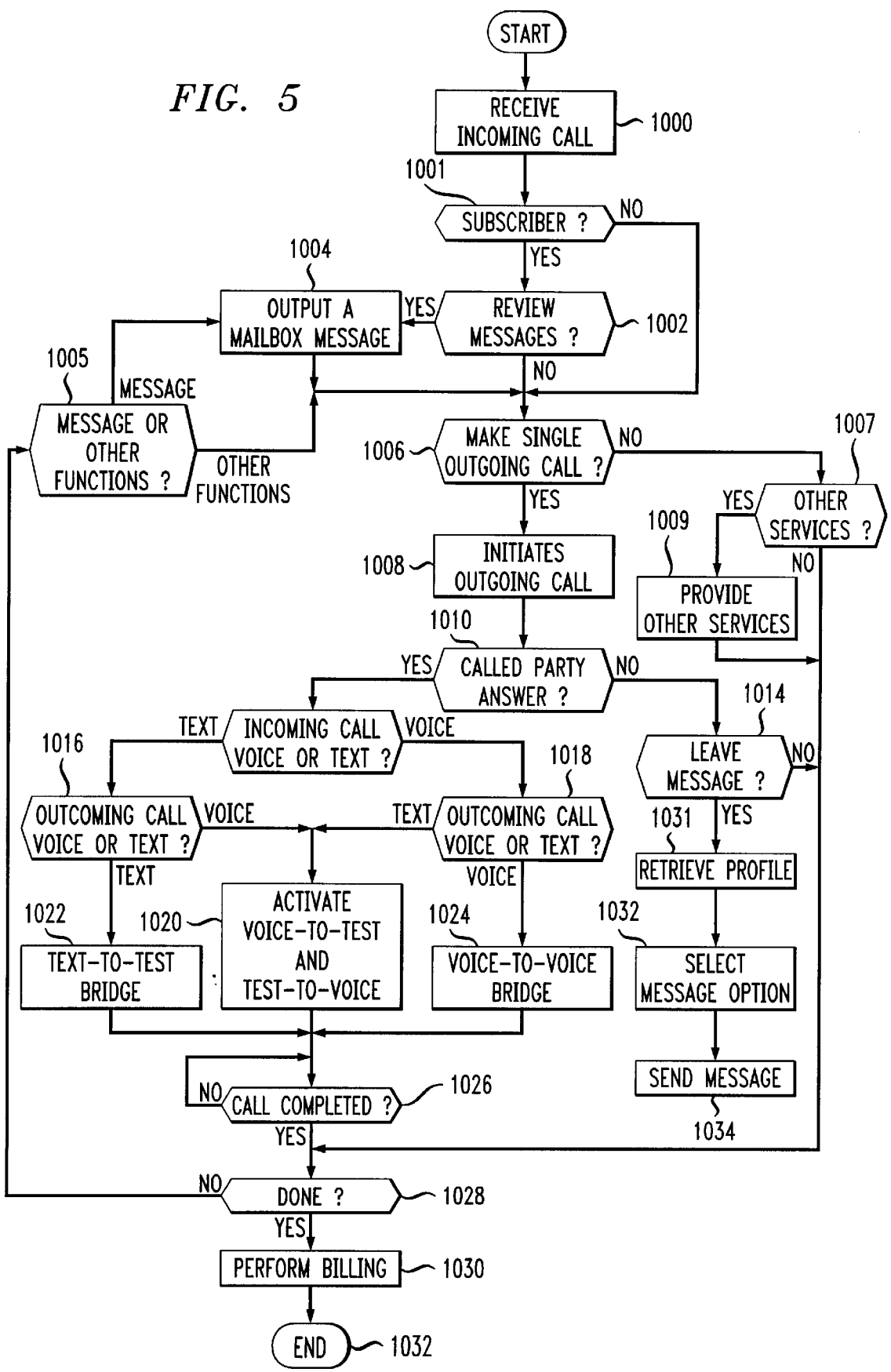
FIG. 5 is a flowchart showing a process of the telecommunication relay device.

FIG. 5 shows an exemplary flowchart of a process of the telecommunication relay device 116 when receiving a call from a first party. In step 1000, the controller 202 receives the incoming call and goes to step 1001. In step 1001, the controller 202 determines if the first party is a subscriber. If a subscriber, the controller 202 goes to step 1002; otherwise, the controller 202 goes to step 1006. In step 1002, the controller 202 queries whether the first party would like to review messages that have been received. If the first party chooses to review messages, the controller 202 goes to step 1004; otherwise the controller goes to step 1006. In step 1004, the controller 202 outputs a number of messages that are stored and permits the first party to select any one of the messages for replay.

For example, if the first party is using a voice terminal, the controller 202 may output a message such as "you have three messages. Please say the message number that you wish to hear." The first party may respond by saying "two" . The controller 202 responds by outputting the second message in the message mailbox.

If the first party is using a text terminal, the controller 202 simply outputs a number of messages that are stored to the first party and requests the first party to select by typing a number indicating the number of the message that should be replayed. If the first party is using an advanced display device such as a personal computer connected to the Internet, for example, the controller 202 may output a number indicating the number of messages together with message header information corresponding to each message or download all the messages to the first party's terminal so that the first party may peruse the complete set of messages and select from any one of the messages for response.

After outputting a message (or other options as discussed above) to the first party, the controller 202 goes to step 1006. In step 1006, the controller 202 queries whether the first party would desire to make a call. A subscriber may desire to respond to a message by making such a call. If the first party desires to make a call, the controller 202 goes to step 1008; otherwise the controller 202 goes to step 1007. In step 1008, if the subscriber desires to respond to a message, the controller 202 retrieves the number of the party that left the message (from the message header, for example) and initiates an outgoing call (call is used generically to indicate contact) to the party and goes to step 1010. For non-subscribers, the controller 202 prompts that first party for the called party information and makes the outgoing call and goes to step 1010. In step 1010, the controller 202 determines whether the called party answers the call. For example, the controller 202 may wait for a predetermined number of rings before deciding that the called party is not answering the call. The controller 202 also "calls" the party on the data network 120 by determining if the party is logged on if the message header indicates a data network identification. If the called party does not answer the call, the controller 202 goes to step 1014; otherwise the controller goes to step 1012.

In step 1012, the controller 202 determines whether the first party's terminal is a text terminal or a voice terminal. For this discussion, a data network connection to the telecommunication relay device 116 may be considered a text terminal, for example. If the first party's terminal is a text terminal, the controller 202 goes to step 1016; otherwise, the controller 202 goes to step 1018. In step 1016, the controller 202 determines whether the called party's terminal is a voice terminal or a text terminal. If the called party's terminal is a text terminal, the controller 202 goes to step 1022; otherwise, the controller 202 goes to step 1020. In step 1022, the controller 202 performs a text-to-text bridge. If both terminals are text telephones, for example, then the controller 202 simply transfers text received from one terminal and outputs it to the other terminal. If one of the terminals is a data network connection such as Internet connection, for example, while the other terminal is a text telephone, the controller 202 opens a private chat room and transfers the text received from the text telephone to the private chat room and transfers the text from the private chat room to the text telephone. After step 1022, the controller goes to step 1026.

In step 1018, the controller 202 determines whether the called party's terminal is a text terminal or a voice terminal similar to step 1016. If the called party's terminal is a text terminal, the controller 202 goes to step 1020; otherwise, the controller goes to step 1024. In step 1024, the controller 202 performs a voice bridge between the first party and the called party and goes to step 1026. In step 1026, the controller 202 determines whether the call has been completed. If completed, the controller 202 goes to step 1028; otherwise, the controller returns to step 1026. In step 1028, the controller 202 determines whether there are any messages remaining in the first party mailbox or whether the first party would like to perform any other function. If the mailbox is empty and/or no other functions are to be performed, the controller 202 goes to step 1030 and performs the billing process and then goes to step 1032 and ends the process; otherwise, the controller 202 goes to step 1005. In step 1005, the controller 202 determines whether the first party (a subscriber) has any remaining messages. If no messages remain, the controller 202 goes to step 1006; otherwise the controller 202 goes to step 1004. The controller 202 goes directly to step 1006 for non-subscribers.

In step 1014, the controller 202 queries whether the first party would like to leave a message for the called party. If a message is to be left, the controller 202 goes to step 1031; otherwise, the controller 202 goes to step 1028. In step 1031, the controller 202 retrieves the first party's profile from the database 122 and goes to step 1032. In step 1032, the controller 202 selects a message output option from the retrieved profile (or from the first party if the first party so indicates) and goes to step 1034. In step 1034, the controller 202 sends the message and goes to step 1028.

In step 1007, the controller 202 queries whether the first party would like to engage in other services. If the first party desires to engage in other services, then the controller 202 goes to step 1009; otherwise, the controller goes to step 1028.

Figure 6:
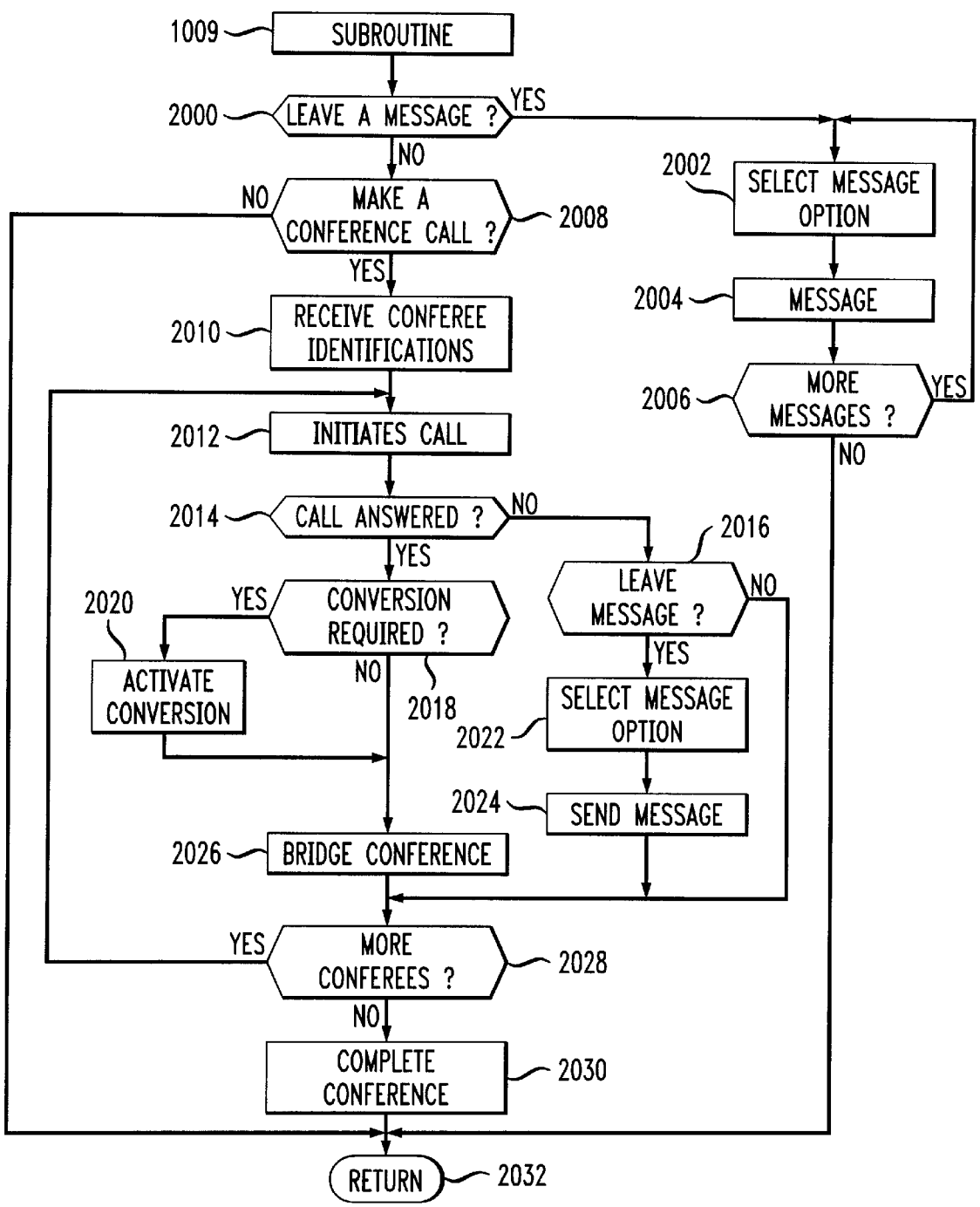
FIG. 6 is a flowchart of a process for providing other services.

FIG. 6 is a flowchart that describes the step 1009 in greater detail. In step 2000, the controller 202 queries whether the first party would like to leave a message to another party without engaging in a real time conversation. If the first party desires to leave a message, the controller 202 goes to step 2002; otherwise, the controller goes to step 2008. In step 2002, the controller 202 selects various options either from the first party's profile or from the first party and goes to step 2004. In step 2004, the controller 202 sends the message and goes to step 2006. In step 2006, the controller queries whether the first party would like to send more messages. If more messages are desired, the controller 202 goes to step 2002; otherwise the controller goes to step 2032 and returns to step 1028 of FIG. 5.

In step 2008, the controller 202 queries whether the first party would like to make a conference call. If a conference call is desired, the controller 202 goes to step 2010; otherwise, the controller 202 goes to step 2032 and returns to step 1028 of FIG. 5.

In step 2010, the controller 202 receives conferee identifications from the first party. Such identification may be provided to the controller 202 at the time of the conference request or the first party may have created conferee lists that are stored in the database 122 and the first party simply provides an identification for the conferee list. The controller 202 retrieves the conferee list to obtain the conferee identifications and goes to step 2012. In step 2012, the controller 202 initiates a call to a conferee and goes to step 2014. For this discussion, a "call" may be a message to a terminal logged onto the data network 120 such as the Internet, for example. In step 2014, the controller 202 determines whether the conferee answered the call. If the call is answered, the controller 202 goes to step 2018; otherwise;

the controller goes to step 2016. In step 2016, the controller 202 queries whether the first party would like to leave a message for the non-answering conferee. If the first party desires to leave a message, the controller 202 goes to step 2022; otherwise, the controller 202 goes to step 2028. In step 2022, the controller 202 selects a message option either directly from the first party or from the first party's profile and goes to step 2024. In step 2024, the controller 202 sends the message and goes to step 2028.

In step 2018, the controller 202 determine whether conversion is required. Such conversion would be from text-to-voice/voice-to-text or from text or voice to a private chat room. If conversion is required, the controller 202 goes to step 2020; otherwise, the controller 202 goes to step 2026. In step 2020, the controller 202 activates the conversion process and goes to step 2026.

In step 2026, the controller 202 bridges the conferees in a conference such as voice-to-voice or text-to-text or private chat room to text or voice, for example, and goes to step 2028. In step 2028, the controller 202 determines whether there are more conferees in the list to be contacted. If more conferees are to be contacted, the controller 202 returns to step 2012 and initiates another call; otherwise, the controller 202 goes to step 2030. In step 2030, the controller 202 continues to perform any conversion that is required until the conference is completed and then goes to step 2032 to return to step 1028 of FIG. 5.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method for relaying communication between a first party using a first terminal of a first type and at least a second party using a second terminal of a second type, the first type being different than the second type, the method comprising:

receiving a first contact from the first party;

at least one of leaving a first message for the second party, outputting a second message received from the second party, or initiating a second contact to the second party; and leaving a third message for the second party if the second party does not answer the second contact, wherein the first message is saved without conversion, wherein if the second party answers the second contact, the method further comprising:

converting first information received from the first terminal into second information;

outputting the second information to the second terminal;

converting third information received from the second terminal into fourth information; and outputting the fourth information to the first terminal, wherein all conversions are performed automatically by a conversion device.

2. The method of claim 1, wherein each of the first and second terminals includes one of a telephone station, a cell phone, a text telephone, a two-way pager, a personal digital assistant, and a data network terminal coupled to the telecommunication relay device via a data network.

3. The method of claim 2, wherein if one of the first and the second terminals is the telephone station and the other one of the first and second terminals is the text telephone, the two-way pager or the personal digital assistant, the method comprising:

converting first voice signals from the telephone station into first text;
outputting the first text to the text telephone, the two-way pager or the personal digital assistant;
converting second text from the text telephone, the two-way pager or the personal digital assistant into second voice signals; and
outputting the second voice signals to the telephone station.

4. The method of claim 2, wherein if one of the first and the second terminals is the telephone station and the other one of the first and second terminals is the data network terminal, the method further comprising:
opening a private chat room;
converting first voice signals from the telephone station into first text;
outputting the first text to the data network terminal through the private chat room;
converting second text from the data network terminal into second voice signals; and
outputting the second voice signals to the telephone station.

5. The method of claim 2, wherein if one of the first and the second terminals is the text telephone, the two-way pager or the personal digital assistant, and the other one of the first and second terminals is the data network terminal, the method further comprising:
opening a private chat room;
converting first text from the text telephone, the two-way pager or the personal digital assistant into second text;
outputting the second text to the data network terminal through the private chat room;
converting third text from the data network terminal into fourth text; and
outputting the fourth text to the text telephone, the two-way pager or the personal digital assistant.

6. The method of claim 1, further comprising formatting the first and third messages with information received from the first party, the information including at least first party identification.

7. The method of claim 1, wherein the first, second and third messages may each be one of a text message, a voice message, and an e-mail message, the method further comprising:
converting the first or third messages to be compatible with the second terminal or the second message to be compatible with the first terminal if the second terminal cannot receive the first or third messages left by the first party or the first terminal cannot receive the second message left by the second party; and
outputting the converted first or third messages to the second terminal or the converted second message to the first terminal.

8. The method of claim 1, further comprising:
initiating a conference based on a conferee list received from the first party;
contacting at least one other conferee in addition to the second party, the conferee using a third terminal of a third type; and
converting information among terminals of each of conferees so that a terminal of each conferee receives the information in a form compatible with the terminal of each conferee.

9. The method of claim 8, wherein the fourth message may be one of a text message, a voice message, and an e-mail message.

10. The method of claim 8, wherein each of the first, second, and third terminals includes one of a telephone station, a text telephone, a two-way pager, a personal digital assistant, and a data network terminal coupled to the telecommunication relay device via a data network.

11. The method of claim 8, further comprising leaving a fourth message to a conferee if the conferee does not respond when contacted.

12. A telecommunication relay device that relays communication between a first party using a first terminal of a first type and at least a second party using a second terminal of a second type, the first type being different than the second type, the device comprising:
a memory; and
a controller coupled to the memory receiving a first contact from the first party, the controller at least one of leaving a first message for the second party, outputting a second message from the memory received from the second party, or initiating a second contact to the second party, and leaving a third message for the second party if the second party does not answer the second contact, saving the first message without conversion, wherein if the second party answers the second contact, the controller converting first information received from the first terminal into second information, outputting the second information to the second terminal, converting third information received from the second terminal into a fourth information, and outputting the fourth information to the first terminal, wherein all conversions are performed automatically by a conversion device.

13. The device of claim 12, wherein each of the first and second terminals includes one of a telephone station, a cell phone, a text telephone, a two-way pager, a personal digital assistant, and a data network terminal coupled to the telecommunication relay device via a data network.

14. The device of claim 13, wherein if one of the first and the second terminals is the telephone station and the other one of the first and second terminals is the text telephone, the two-way pager or the personal digital assistant, the controller converts first voice signals from the telephone station into first text, outputs the first text to the text telephone, the two-way pager or the personal digital assistant, converts second text from the text telephone, the two-way pager or the personal digital assistant into second voice signals, and outputs the second voice signals to the telephone station.

15. The device of claim 13, wherein if one of the first and the second terminals is the telephone station and the other one of the first and second terminals is the data network terminal, the controller opens a private chat room, converts first voice signals from the telephone station into first text, outputs the first text to the data network terminal through the private chat room, converts second text from the data network terminal into second voice signals, and outputs the second voice signals to the telephone station.

16. The device of claim 13, wherein if one of the first and the second terminals is the text telephone, the two-way pager or the personal digital assistant, and the other one of the first and second terminals is the data network terminal, the controller opens a private chat room, converts first text from the text telephone, the two-way pager or the personal digital assistant into second text, outputs the second text to the data network terminal through the private chat room, converts third text from the data network terminal into fourth text, and outputs the fourth text to the text telephone, the two-way pager or the personal digital assistant.

17. The device of claim 12, wherein the controller formats the first and third messages with information received from the first party, the information including at least first party identification.

18. The device of claim 12, wherein the first, second and third messages may each be one of a text message, a voice message, and an e-mail message, the controller converting the first or third messages to be compatible with the second terminal or the second message to be compatible with the first terminal if the second terminal cannot receive the first or third messages left by the first party or the first terminal cannot receive the second message left by the second party, and outputting the converted first or third messages to the second terminal or the converted second message to the first terminal.

19. The device of claim 12, wherein the controller initiates a conference based on a conferee list received from the first party, contacts at least one other conferee in addition to the second party, the conferee using a third terminal of a third type, and converts information among terminals of each of conferees so that a terminal of each conferee receives the information in a form compatible with the terminal of each conferee.

20. The device of claim 19, wherein the controller leaves a fourth message to a conferee if the conferee does not respond to the controller when contacted.

21. The device of claim 20, wherein the fourth message may be one of a text message, a voice message, and an e-mail message.

22. The device of claim 19, wherein each of the first, second, and third terminals includes one of a telephone station, a text telephone, a two-way pager, a personal digital assistant, and a data network terminal coupled to the telecommunication relay device via a data network.

* * * * *